United States Patent
Yamanaka et al.

(10) Patent No.: US 11,475,690 B2
(45) Date of Patent: Oct. 18, 2022

(54) VEHICLE CONTROL SYSTEM AND VEHICLE CONTROL METHOD

(71) Applicant: HONDA MOTOR CO., LTD., Tokyo (JP)

(72) Inventors: Hiroshi Yamanaka, Wako (JP); Katsuyasu Yamane, Wako (JP); Yoshitaka Mimura, Wako (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 277 days.

(21) Appl. No.: 16/804,042

(22) Filed: Feb. 28, 2020

(65) Prior Publication Data
US 2020/0285846 A1   Sep. 10, 2020

(30) Foreign Application Priority Data

Mar. 7, 2019  (JP) .............................. JP2019-041993

(51) Int. Cl.
*G06K 9/00* (2022.01)
*G06V 40/10* (2022.01)
(Continued)

(52) U.S. Cl.
CPC .......... *G06V 40/103* (2022.01); *B60W 10/04* (2013.01); *B60W 10/20* (2013.01);
(Continued)

(58) Field of Classification Search
CPC ................. G06Q 50/30; G06Q 10/047; G06Q 10/06311; G06Q 30/0645; G06Q 30/0284; G06Q 20/3224; G06Q 20/327; G06Q 2240/00; G06Q 20/40; G06Q 20/3276; G06Q 10/06313; G06Q 20/3274;
(Continued)

(56) References Cited

U.S. PATENT DOCUMENTS

2016/0378303 A1\* 12/2016 Crilley .................... G06F 21/00
                                                              715/733
2017/0147959 A1\*  5/2017 Sweeney ........ G06Q 10/063114
(Continued)

FOREIGN PATENT DOCUMENTS

JP    2016-018413    2/2016
JP    2017-121865    7/2017

OTHER PUBLICATIONS

Japanese Notice of Allowance for Japanese Patent Application No. 2019-041993 dated May 10, 2022.

*Primary Examiner* — Jelani A Smith
*Assistant Examiner* — Paul A Castro
(74) *Attorney, Agent, or Firm* — Amin, Turocy & Watson, LLP

(57) ABSTRACT

A vehicle control system includes a recognizer configured to recognize first content displayed on a terminal device, and an identifier configured to identify a person carrying the terminal device with the first content displayed thereon outside the vehicle as a user scheduled to use the vehicle or a person relevant to the user on the basis of a comparison between the first content recognized by the recognizer and one or more pieces of content associated with the vehicle.

8 Claims, 10 Drawing Sheets

(51) Int. Cl.
*B60W 10/04* (2006.01)
*B60W 10/20* (2006.01)
*G06Q 10/06* (2012.01)
*G06V 10/56* (2022.01)

(52) U.S. Cl.
CPC ....... *G06Q 10/06311* (2013.01); *G06V 10/56* (2022.01); *B60W 2420/42* (2013.01); *B60W 2540/041* (2020.02); *B60W 2556/45* (2020.02); *B60W 2710/20* (2013.01); *B60W 2720/10* (2013.01)

(58) Field of Classification Search
CPC .......... G08G 1/202; G08G 1/123; G08G 1/20; G08G 1/096725; G08G 1/017; G08G 1/0968; G08G 5/065; G05D 1/0088; G05D 2201/0213; G05D 2201/0212; G05D 1/0291; G05D 1/0022; G05D 1/0027; G05D 1/021; G05D 1/0246; G05D 1/0231; G05D 1/02; G05D 1/0287; G05D 1/0016; G01C 21/3407; G01C 21/3623; H04W 4/40; H04W 4/029; H04W 4/02; H04W 4/023; H04W 4/024; H04W 12/06; H04W 4/021; H04W 4/80; H04W 76/10; H04W 4/025; H04W 12/08; H04W 12/069; G06V 40/103; G06V 10/56; B60W 10/04; B60W 10/20; B60W 2420/42; B60W 2540/041; B60W 2556/45; B60W 2710/20; B60W 2720/10
See application file for complete search history.

(56) References Cited

U.S. PATENT DOCUMENTS

2017/0153714 A1* 6/2017 Gao ........................ G06V 40/20
2017/0178269 A1* 6/2017 McKinnon ............. G06Q 50/30

* cited by examiner

VEHICLE CONTROL SYSTEM AND VEHICLE CONTROL METHOD

CROSS-REFERENCE TO RELATED APPLICATION

Priority is claimed on Japanese Patent Application No. 2019-041993, filed Mar. 7, 2019, the content of which is incorporated herein by reference.

BACKGROUND

Field of the Invention

The present invention relates to a vehicle control system and a vehicle control method.

Description of Related Art

A technology for changing a stop position of a vehicle on the basis of a gesture of an occupant is known (see, for example, Japanese Unexamined Patent Application, First Publication No. 2017-121865).

SUMMARY

However, in the related art, when there are many persons around a vehicle that is being remotely operated on the basis of specific gestures and all the persons are performing the same gesture, it is not possible to accurately identify a user who is remotely operating the vehicle from outside the vehicle in some cases.

An aspect of the present invention provides a vehicle control system and a vehicle control method capable of accurately identifying a user who is remotely operating a vehicle from outside the vehicle.

The vehicle control system and the vehicle control method according to the present invention have adopted the following configurations.

(1) An aspect of the present invention is a vehicle control system including: a recognizer configured to recognize first content displayed on a terminal device; and an identifier configured to identify a person carrying the terminal device with the first content displayed thereon outside the vehicle as a user scheduled to use the vehicle or a person relevant to the user on the basis of a comparison between the first content recognized by the recognizer and one or more pieces of content associated with the vehicle.

According to an aspect (2), in the vehicle control system according to the aspect (1), the identifier is configured to identify the person as the user or the person relevant to the user when the first content recognized by the recognizer is the same as any one of the one or more pieces of content.

According to an aspect (3), the vehicle control system according to the aspect (1) or (2) further includes a first controller configured to control steering and a speed of the vehicle so that the vehicle is stopped on the side of the user or the person relevant to the user when the identifier is configured to identify that the person is the user or the person relevant to the user.

According to an aspect (4), in the vehicle control system according to any one of the aspects (1) to (3), a first image with an arrangement of one or more colors is included in the first content, a second image with an arrangement of one or more colors is included in each of the one or more pieces of content, and the identifier is configured to identify the person as the user or the person relevant to the user when the color arrangement of the first image is the same as the color arrangement of the second image.

According to an aspect (5), in the vehicle control system according to any one of the aspects (1) to (4), a first image in which a first pattern has been drawn is included in the first content, a second image in which a second pattern has been drawn is included in each of the one or more pieces of content, and the identifier is configured to identify the person as the user or the person relevant to the user when the first pattern is the same as the second pattern.

According to an aspect (6), the vehicle control system according to any one of the aspects (1) to (5) further includes a communicator configured to communicate with the terminal device; and a second controller configured to control the communicator so that information is transmitted to the terminal device carried by the user of the vehicle, thereby displaying content on the terminal device.

According to an aspect (7), in the vehicle control system according to the aspect (6), when the recognizer has recognized that the first content is displayed on each of the plurality of terminal devices, the identifier is configured to compare each of a plurality of pieces of first content recognized by the recognizer with the one or more pieces of content, when at least two pieces of first content among the plurality of pieces of first content recognized by the recognizer are the same as any one of the one or more pieces of content, the second controller controls the communicator so that second content different from the first content is displayed on the terminal device carried by the user or the person relevant to the user, the second content being the same as any one of the one or more pieces of content, and when the recognizer has recognized that the second content has been displayed on any one of the plurality of terminal devices after the second controller displays the second content on the terminal device carried by the user of the vehicle, the identifier is configured to identify a person carrying the terminal device on which the second content has been displayed as the user or the person relevant to the user.

According to the aspect (8), in the vehicle control system according to the aspect (6) or (7), when the second controller displays content on the terminal device, the second controller is configured to brighten a screen of the terminal device, as compared with a case in which the second controller does not display the content on the terminal device.

According to an aspect (9), in the vehicle control system according to any one of the aspects (1) to (8), first sub-content associated with a control aspect of the vehicle is included in the first content, second sub-content associated with the control aspect of the vehicle is included in each of the one or more pieces of content, and the vehicle control system further comprises a third controller configured to control the vehicle on the basis of the control aspect associated with the first sub-content or the second sub-content when the first sub-content is the same as the second sub-content.

(10) Another aspect of the present invention is a vehicle control method including: recognizing, by a computer, first content displayed on a terminal device; and identifying, by the computer, a person carrying the terminal device with the first content displayed thereon outside the vehicle as a user scheduled to use the vehicle or a person relevant to the user on the basis of a comparison between the recognized first content and one or more pieces of content associated with the vehicle.

According to any one of (1) to (10), it is possible to accurately identify a user who is remotely operating a vehicle from outside a vehicle.

DESCRIPTION OF EMBODIMENTS

Hereinafter, embodiments of a vehicle control system and a vehicle control method according to the present invention will be described with reference to the drawings.

First Embodiment

Figure 1:
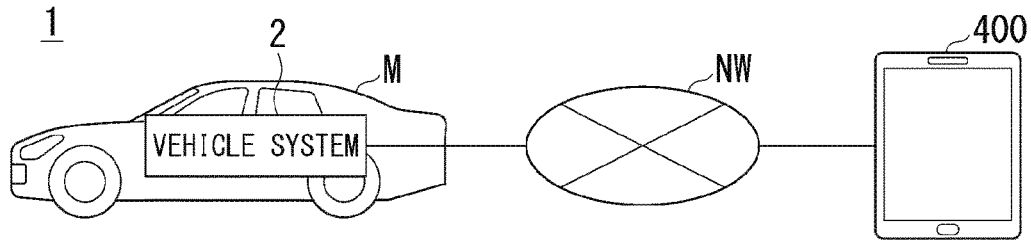
FIG. 1 is a diagram showing an example of a user identification system according to a first embodiment.

FIG. 1 is a diagram showing an example of a user identification system 1 according to a first embodiment. The user identification system 1 according to the first embodiment includes a vehicle system 2 mounted in a vehicle M, and a terminal device 400. The vehicle system 2 and the terminal device 400 are connected via a network NW. The network NW includes a local area network (LAN), a wide area network (WAN), and the like. The network NW may include, for example, a network using wireless communication such as Wi-Fi or Bluetooth (registered trademark; the same applies hereinafter), or may include an application server, a web server, or the like.

The host vehicle M in which the vehicle system 2 is mounted is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell. The host vehicle M may be a vehicle owned by an individual, may be a vehicle intended for use by an unspecified number of users, such as a taxi, a bus, or a rental car, or may be a vehicle to be shared among specific users via a service such as car sharing.

The vehicle system 2 controls at least one of a speed and steering of a vehicle M (hereinafter referred to as a host vehicle M) in which the host system has been mounted or controls both of the speed and the steering so that the host vehicle M is automatically driven without depending on a driving operation of a driver of the host vehicle M (hereinafter referred to as automated driving). For example, when the vehicle system 2 automatically drives the host vehicle M, the vehicle system 2 identifies a user scheduled to use the host vehicle M from among one or a plurality of persons present outside the host vehicle M or identifies the person relevant to the user, to move the host vehicle M to the vicinity of the identified user or person relevant to the user.

"Use host vehicle M" means, for example, boarding and moving, depositing luggage, or receiving luggage. The person relevant to the user is, for example, an employee of a hotel in which the user stays, a family of the user, a friend of the user, or the like, and is a person requested by the user to turn a screen of the terminal device 400 on which specific content to be described below has been displayed, to the host vehicle M. Hereinafter, a user scheduled to use the host vehicle M will be referred to as a "user of the host vehicle M".

The terminal device 400 is a terminal device that can be used by the user of each vehicle M in which the vehicle system 2 is mounted. Typically, the terminal device 400 is a mobile phone or a tablet terminal including a touch panel serving as both a user interface and a display, a wireless communication interface including an antenna, a storage, and a computation device such as a central processing unit (CPU). In the terminal device 400, a user agent (UA) such as a web browser or an application program is activated. The terminal device 400 in which the UA has been activated receives various input operations from the user and performs various processes according to the received input operations. For example, the terminal device 400 displays a certain specific content on a display such as a touch panel in response to an input operation of the user. The specific content is an animation using a multi-image of a still image, a moving image, or a GIF (Graphics Interchange Format) that allows the vehicle system 2 to identify the user of the host vehicle M or a person relevant to the user from a plurality of user candidates present outside the vehicle. The specific content may be unique content that is different for each vehicle M. For example, when the specific content is a still image, one or more colors different for each vehicle M may be arranged in the image, or a pattern different for each vehicle M may be drawn.

The pattern drawn in the image, which is the content, may be, for example, a geometric pattern such as a stripe pattern or a polka dot pattern, may be a pattern in which information such as a two-dimensional code has been encrypted, or may be a pattern for identifying the user and his or her family, such as a family crest.

[Configuration of Vehicle System]

Figure 2:
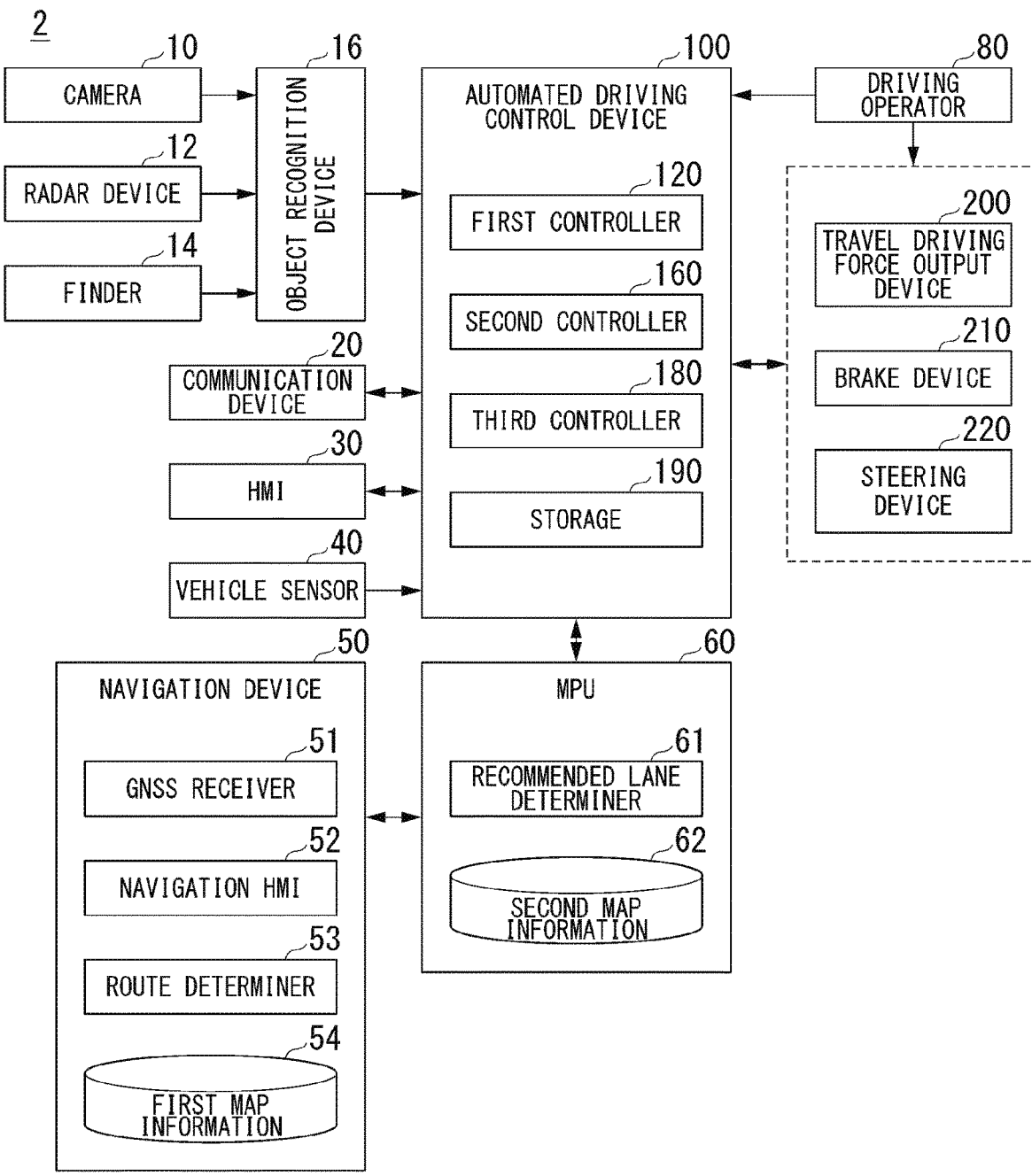
FIG. 2 is a configuration diagram of a vehicle system according to the first embodiment.

FIG. 2 is a configuration diagram of the vehicle system 2 according to the first embodiment. The vehicle system 2 according to the first embodiment includes, for example, a camera 10, a radar device 12, a finder 14, an object recognition device 16, a communication device 20, a person machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to any place on a vehicle in which the vehicle system 2 is mounted (hereinafter, a host vehicle M). In the case of forward imaging, the camera 10 is attached to an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any place on the host vehicle M. The radar device 12 may detect a position and a speed of the object using a frequency modulated continuous wave (FM-CW) scheme.

The finder 14 is a light detection and ranging (LIDAR). The finder 14 radiates light to the surroundings of the host vehicle M and measures scattered light. The finder 14 detects a distance to a target on the basis of a time from light emission to light reception. The radiated light is, for example, pulsed laser light. The finder 14 is attached to any place on the host vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the automated driving control device 100. The object recognition device 16 may output the detection results of the camera 10, the radar device 12, and the finder 14 as they are to the automated driving control device 100. The object recognition device 16 may be omitted from the vehicle system 2.

The communication device 20 communicates with other vehicles present around the host vehicle M, and a parking lot management device, the terminal device 400, a web server, an application server, and the like, which will be described below, via the network NW, for example. The communication device 20 may communicate with the other vehicles present around the host vehicle M using dedicated short range communication (DSRC) or the like.

The HMI 30 presents various types of information to the user of the host vehicle M and receives an input operation from the user. The HMI 30 includes a display, speakers, buzzers, touch panels, switches, keys, and the like.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M on the basis of a signal received from a GNSS satellite. The position of the host vehicle M may be specified or supplemented by an inertial navigation system (INS) using an output of the vehicle sensor 40. The navigation HMI 52 includes a display, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the user using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the user. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch place in the on-map route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a variant steer, a joystick, and other operators. A sensor that detects the amount of operation or the presence or absence of operation is attached to the driving operator 80, and a detection result thereof is output to the automated driving control device 100 or some or all of the travel driving force output device 200, the brake device 210, and the steering device 220.

The automated driving control device 100 includes, for example, a first controller 120, a second controller 160, a third controller 180, and a storage 190. The first controller 120, the second controller 160, and the third controller 180 are realized, for example, by a processor such as a CPU or a graphics processing unit (GPU) executing a program (software). Some or all of these components may be realized by hardware (circuit portion; including circuitry) such as a large scale integration (LSI), an application specific integrated circuit (ASIC), or a field-programmable gate array (FPGA) or may be realized by software and hardware in cooperation. The program may be stored in an HDD, a flash memory, or the like of the storage 190 in advance or may be stored in a detachable storage medium such as a DVD or a CD-ROM and installed in the storage 190 by the storage medium being mounted in a drive device.

The storage 190 is realized by, for example, an HDD, a flash memory, an electrically erasable programmable read-only memory (EEPROM), a read only memory (ROM), or a random access memory (RAM). The storage 190 stores, for example, a program that is read and executed by a processor, or the content data 192.

The content data 192 is data or information including the specific content described above. For example, the content data 192 includes one or a plurality of unique pieces of content associated with the host vehicle M as the specific content.

Figure 3:
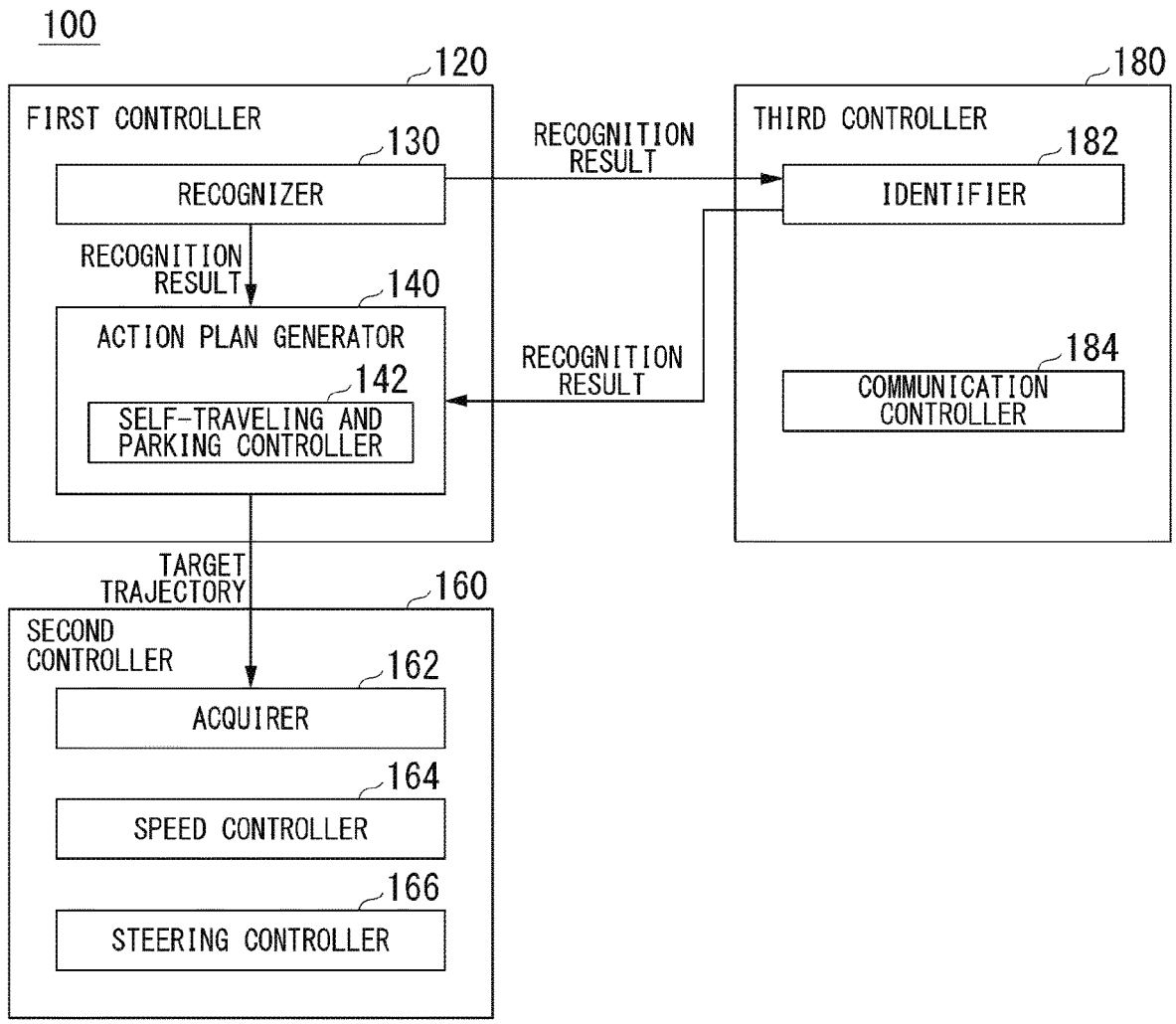
FIG. 3 is a functional configuration diagram of a first controller, a second controller, and a third controller.

FIG. 3 is a functional configuration diagram of the first controller 120, the second controller 160, and the third controller 180. The first controller 120 includes, for example, a recognizer 130 and an action plan generator 140.

The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is guaranteed.

The recognizer 130 recognizes a surroundings situation of the host vehicle M on the basis of information input from the camera 10, the radar device 12, and the finder 14 via the object recognition device 16, that is, a detection result subjected to sensor fusion. For example, the recognizer 130 recognizes a state such as a position, speed, or acceleration of an object present around the host vehicle M, as the surroundings situation. Examples of the object recognized as the surroundings situation include moving objects such as pedestrians or other vehicles, or a stationary body such as such as construction tools. The position of the object, for example, is recognized as a position at coordinates with a representative point (a centroid, a drive shaft center, or the like) of the host vehicle M as an origin, and is used for control. The position of the object may be represented by a representative point such as a centroid or a corner of the object or may be represented by an area having a spatial extent. The "state" of the object may include an acceleration or jerk of the object, or an "action state" (for example, whether or not the object is changing lanes or is about to change lanes).

For example, the recognizer 130 recognizes a lane in which the host vehicle M is traveling (hereinafter referred to as a host lane), an adjacent lane adjacent to the host lane, or the like as the surroundings situation. For example, the recognizer 130 compares a pattern of a road marking line (for example, an arrangement of a solid line and a broken line) obtained from the second map information 62 with a pattern of a road marking line around the host vehicle M recognized from an image captured by the camera 10 to recognize the host lane or the adjacent lane. The recognizer 130 may recognize not only the road marking lines but also a traveling road boundary (a road boundary) including road demarcation lines, a road shoulder, a curb, a median strip, a guard rail, or the like to recognize the host lane or the adjacent lane. In this recognition, the position of the host vehicle M acquired from the navigation device 50 or a processing result of an INS may be additionally considered. The recognizer 130 may recognize a sidewalk, a stop line (including a temporary stop line), an obstacle, a red light, a toll gate, a road structure, and other road events.

The recognizer 130 recognizes a relative position or posture of the host vehicle M with respect to a host lane when recognizing the host lane. The recognizer 130 may recognize, for example, a deviation of a reference point of the host vehicle M with respect to a center of the lane and an angle formed between a vector indicating a traveling direction of the host vehicle M and a line connecting the center of the lane as the relative position and posture of the host vehicle M with respect to the host lane. Instead, the recognizer 130 may recognize, for example, a position of the reference point of the host vehicle M with respect to any one of side end portions (the road marking line or the road boundary) of the host lane as the relative position of the host vehicle M with respect to the host lane.

The recognizer 130 may recognize one or a plurality of persons outside the host vehicle M on the basis of information input from the camera 10, the radar device 12, and the finder 14 via the object recognition device 16. When the recognizer 130 recognizes the one or plurality of persons, the recognizer 130 analyzes an image of the camera 10 to recognize content displayed on a screen of a display of the terminal device 400 carried by each person. The phrase "carried" may indicate, for example, that a person is holding the terminal device 400 in his or her hand, or may indicates that the terminal device 400 is hung on a neck, arm, or the like of the person through a strap or the like. When the recognizer 130 recognizes the content, the recognizer 130 provides information on the recognized content to the third controller 180. The information on the content is, for example, image data obtained by cutting out an area of the screen of the display on which the content has been displayed, from the image captured by the camera 10.

The action plan generator 140 determines an automated driving event in a route in which the recommended lane has been determined. The automated driving event is information defining an aspect of a behavior to be taken by the host vehicle M under the automated driving described above, that is, a traveling aspect.

An event includes, for example, a parking event, a stop event, a forward traveling event, and a backward traveling event. The parking event is an event in which the user of the host vehicle M does not park the host vehicle M in a parking space, but the host vehicle M is caused to autonomously travel and parked in the parking space, as in valet parking. The stop event is an event in which the host vehicle M is stopped on the spot. The forward traveling event is an event in which the host vehicle M travels forward while moving slowly. The backward traveling event is an event in which the host vehicle M travels backward while moving slowly.

The event may further include, for example, a constant speed traveling event, a following traveling event, a lane change event, a branch event, a merging event, an overtaking event, an avoidance event, or a takeover event. The constant speed traveling event is an event in which the host vehicle M is caused to travel in the same lane at a constant speed. The following traveling event is an event in which a vehicle present within a predetermined distance (for example, within 100 [m]) ahead of the host vehicle M and closest to the host vehicle M (hereinafter referred to as a preceding vehicle) is caused to follow the host vehicle M. "Following" may be, for example, a traveling aspect in which a relative distance (an inter-vehicle distance) between the host vehicle M and the preceding vehicle is kept constant, or may be a traveling aspect in which the host vehicle M is caused to travel in a center of the host lane, in addition to the relative distance between the host vehicle M and the preceding vehicle being kept constant. The lane change event is an event in which the host vehicle M is caused to change lanes from the host lane to an adjacent lane. The branching event is an event in which the host vehicle M is caused to branch to a lane on the destination side at a branch point on a road. The merging event is an event in which the host vehicle M is caused to merge with a main lane at a merging point. The overtaking event is an event in which the host vehicle M is first caused to perform lane change to an adjacent lane, overtake a preceding vehicle in the adjacent lane, and then, perform lane change to an original lane again. The avoidance event is an event in which the host vehicle M is caused to perform at least one of braking and steering in order to avoid an obstacle present in front of the host vehicle M. The takeover event is an event in which the automated driving ends and switching to the manual driving occurs.

Further, the action plan generator 140 may change an event already determined for a current section or a next section to another event or determine a new event for the current section or the next section according to the surroundings situation recognized by the recognizer 130 when the host vehicle M is traveling.

The action plan generator 140 generates a future target trajectory in which the host vehicle M will travel in the recommended lane determined by the recommended lane determiner 61 in principle, and the host vehicle M is caused to travel automatically (without depending on a driver's operation) in a traveling aspect defined by the events in order to cope with the surroundings situation when the host vehicle M travels in the recommended lane. The target trajectory includes, for example, a position element that defines a future position of the host vehicle M, and a speed element that defines a future speed, acceleration, or the like of the host vehicle M.

For example, the action plan generator 140 determines a plurality of points (trajectory points) that the host vehicle M is to reach in order, as the position elements of the target trajectory. The trajectory point is a point that the host vehicle M is to reach for each predetermined traveling distance (for example, several [m]). The predetermined traveling distance may be calculated, for example, using a road distance when the host vehicle M travels along the route.

The action plan generator 140 determines a target speed or a target acceleration at every predetermined sampling time (for example, every several tenths of a second) as the speed elements of the target trajectory. The trajectory points for each sampling time may be positions that the host vehicle M will reach at predetermined sampling times. In this case, the target speed or the target acceleration is determined using the sampling time and an interval between the trajectory points. The action plan generator 140 outputs information indicating the generated target trajectory to the second controller 160.

The self-traveling and parking controller 142 is a function of the action plan generator 140, and is started when the action plan generator 140 executes a self-traveling and parking event. Details of the function of the self-traveling and parking controller 142 will be described below.

The second controller 160 controls some or all of the travel driving force output device 200, the brake device 210, and the steering device 220 so that the host vehicle M passes through the target trajectory generated by the action plan generator 140 at a scheduled time. That is, the second controller 160 automatically drives the host vehicle M on the basis of the target trajectory generated by the action plan generator 140.

The second controller 160 includes, for example, an acquirer 162, a speed controller 164, and a steering controller 166. The action plan generator 140 and the second controller 160 described above are examples of a "first controller".

The acquirer 162 acquires information on the target trajectory (trajectory points) generated by the action plan generator 140 and stores the information on the target trajectory in a memory of the storage 190.

The speed controller 164 controls one or both of the travel driving force output device 200 and the brake device 210 on the basis of the speed element (for example, the target speed or target acceleration) included in the target trajectory stored in the memory. The steering controller 166 controls the steering device 220 according to the position element (for example, a curvature indicating a degree of curvature of the target trajectory) included in the target trajectory stored in the memory.

Processes of the speed controller 164 and the steering controller 166 are realized by, for example, a combination of feedforward control and feedback control. For example, the steering controller 166 executes a combination of feedforward control according to a curvature of a road in front of the host vehicle M and feedback control based on a deviation of the host vehicle M with respect to the target trajectory.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and a power electronic controller (ECU) that controls these. The power ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder, as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

The third controller 180 includes, for example, an identifier 182 and a communication controller 184. The communication controller 184 is an example of a "second controller".

The identifier 182 identifies that a person carrying the terminal device 400 is the user of the host vehicle M or a person relevant to the user of the host vehicle M on the basis of the content displayed on the screen of the terminal device 400, which has been recognized by the recognizer 130. For example, the identifier 182 calculates a degree of similarity between the content (an example of the first content) recognized by the recognizer 130 and the content included in the content data 192, and identifies the person carrying the terminal device 400 as the user of the host vehicle M or the person relevant to the user when the degree of similarity is equal to or greater than the threshold value and the pieces of content are regarded as being the same. On the other hand, the identifier 182 does not identify the person carrying the terminal device 400 as the user of the host vehicle M or the person relevant to the user when the degree of similarity is smaller than the threshold value and the pieces of content are not regarded as being the same. The degree of similarity may be obtained by matching between feature points obtained from a still image or a moving image, comparison between histograms, or the like. The degree of similarity may be obtained as a degree of cosine similarity of a multidimensional vector having a plurality of feature amounts or statistics obtained from a still image, a moving image, or the like as elements.

For example, when the content included in the content data 192 is an image with an arrangement of one or more colors different for each vehicle M, the identifier 182 may compare the color arrangement of the image recognized as the content by the recognizer 130 with the color arrangement of the image included in the content data 192, and identify the person carrying the terminal device 400 as the user of the host vehicle M or the person relevant to the user when these coloring are the same with a degree of similarity greater than or equal to a threshold value.

For example, when the content included in the content data 192 is an image in which a different pattern has been drawn for each vehicle M, the identifier 182 compares a pattern of the image recognized as the content by the recognizer 130 with a pattern of the image included in the content data 192. When the patterns are the same as each other with a degree of similarity equal to or greater than a threshold value, the identifier 182 may identify the person carrying the terminal device 400 as the user of the host vehicle M or the person relevant to the user. When the pattern is an encrypted code such as a one-dimensional code or a two-dimensional code, the identifier 182 may decrypt the encrypted code included in the image recognized as the content by the recognizer 130, and identify the person carrying the terminal device 400 on which the image in which the encrypted code has been drawn as a pattern has been displayed, as the user of the host vehicle M or the person relevant to the user on the basis of decrypted information thereof.

When the identifier 182 identifies that the person carrying the terminal device 400 is the user of the host vehicle M or the person relevant to the user or when the identifier 182 identifies that the person carrying the terminal device 400 is not the user of the host vehicle M or the person relevant to the user, the identifier 182 provides a result of the identification to the action plan generator 140. Then, the action plan generator 140 changes an event that is being executed to another event or continuously executes the event that is being executed.

When the identifier 182 identifies that the person carrying the terminal device 400 is not the user of the host vehicle M or the person relevant to the user, the communication controller 184 controls the communication device 20 so that information for displaying other content (hereinafter referred to as alternative content) different from the currently displayed content is transmitted to the terminal device 400 assumed to be carried by the user of the host vehicle M or the person relevant to the user. The information for displaying the alternative content may be, for example, content itself such as a still image or a moving image. When a plurality of pieces of content are installed in the terminal device 400 in advance, the information for displaying the alternative content may be a command for switching content to be displayed on the screen. Thereby, when the user or the person relevant to the user of the host vehicle M is included among the one or more persons recognized by the recognizer 130, content displayed on the screen of the terminal device 400 carried by the person is replaced with the alternative content. The alternative content is an example of "second content".

[Configuration of Terminal Device]

Figure 4:
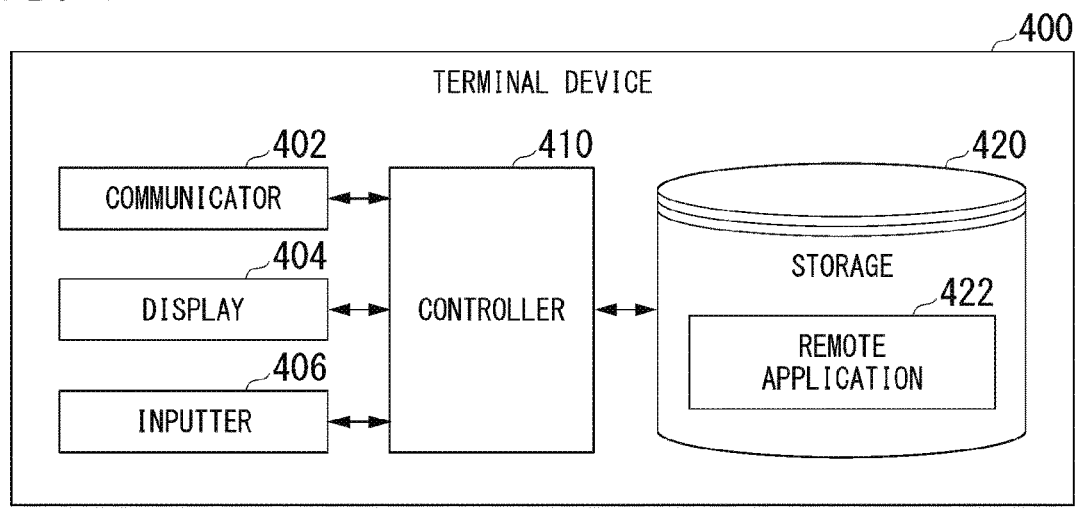
FIG. 4 is a configuration diagram of a terminal device according to the first embodiment.

FIG. 4 is a configuration diagram of the terminal device 400 according to the first embodiment. The terminal device 400 according to the first embodiment includes, for example, a communicator 402, a display 404, an inputter 406, a controller 410, and a storage 420.

The communicator 402 includes hardware for connection to the network NW. For example, the communicator 402 may include an antenna and a transmission and reception device, and an NIC. The communicator 402 communicates with the vehicle system 2 via the network NW, and communicates with a web server, an application server, or the like.

The display 404 includes a display such as a liquid crystal display (LCD) or an organic electroluminescence (EL) display. The display 404 displays content such as a still image or a moving image on the basis of information output by the controller 410.

The inputter 406 includes, for example, a user interface such as buttons, a keyboard, and a mouse. The inputter 406 receives a user operation and outputs a signal according to the received operation to the controller 410. The inputter 406 may be a touch panel configured integrally with the display 404.

The controller 410 is realized by, for example, a processor such as a CPU executing a program or an application stored in the storage 420. The controller 410 may be realized by hardware such as an LSI, an ASIC, or an FPGA.

The storage 420 is realized by, for example, an HDD, a flash memory, an EEPROM, a ROM, or a RAM. Programs or applications that are referred to by a processor realizing the controller 410, for example, are stored in the storage 420. The applications include, for example, an application for remotely controlling the host vehicle M from outside the host vehicle (hereinafter referred to as a remote application 422). One or a plurality of pieces of content may be stored as the specific content in the storage 420.

[Self-Traveling and Parking Event—at the Time of Entry]

Figure 5:
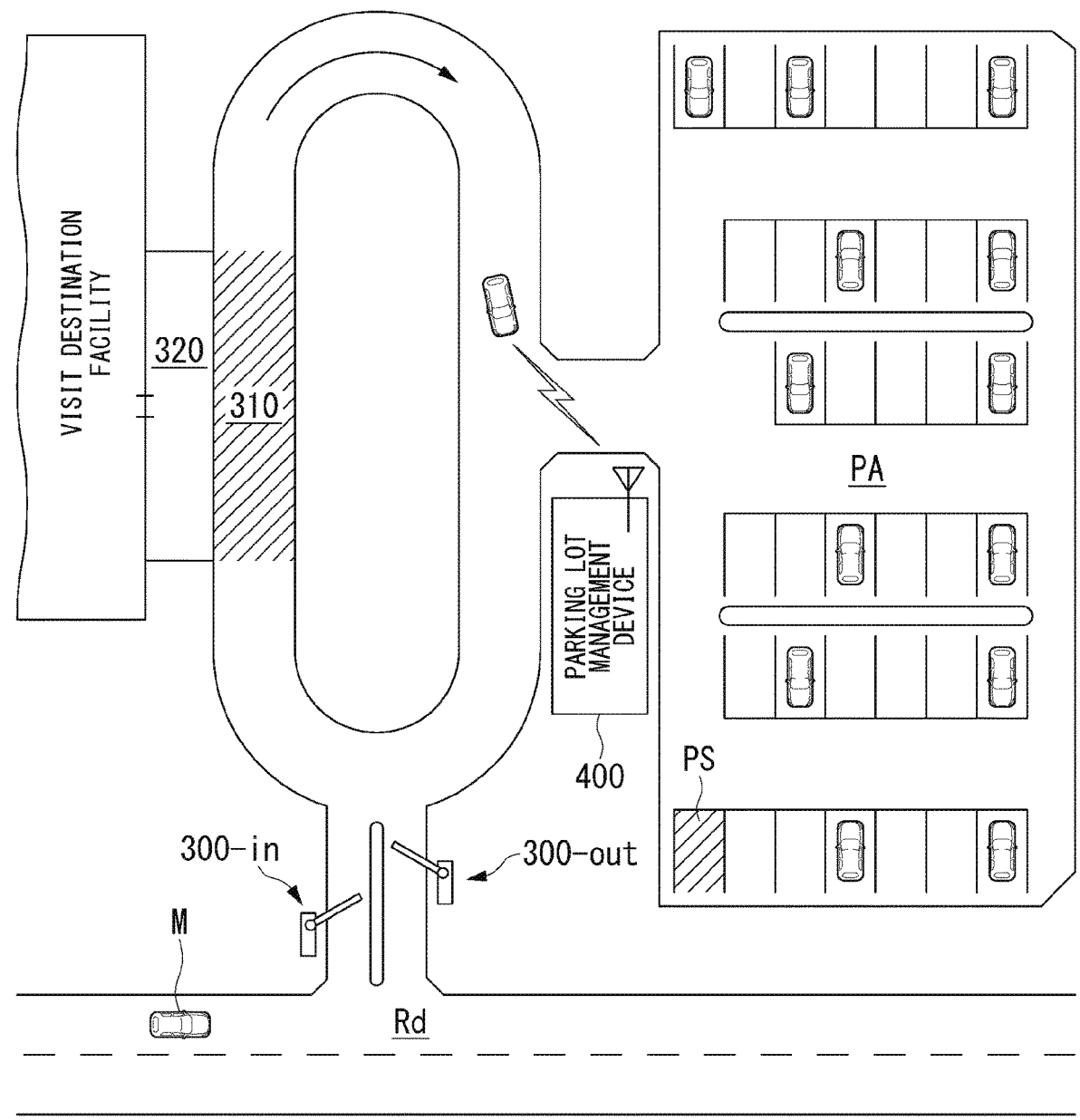
FIG. 5 is a diagram schematically showing a scene in which a self-traveling and parking event is executed.

Hereinafter, a function of the self-traveling and parking controller 142 will be described. The self-traveling and parking controller 142 parks the host vehicle M in the parking space on the basis of information acquired from a parking lot management device 500 by the communication device 20, for example. FIG. 5 is a diagram schematically showing a scene in which the self-traveling and parking event is executed. Gates 300-in and 300-out are provided on a route from a road Rd to the visit destination facility. The visit destination facility includes, for example, shopping stores, restaurants, accommodation facilities such as hotels, airports, hospitals, and event venues.

The host vehicle M passes through the gate 300-in and travels to the stop area 310 through manual driving or automated driving. The manual driving means controlling steering of the host vehicle M (the steering device 220) by the user operating the steering wheel, and controlling the speed (the travel driving force output device 200 and/or the brake device 210) of the host vehicle M by the user operating the accelerator pedal or the brake pedal.

The stop area 310 is an area that faces the boarding and alighting area 320 connected to the visit destination facility, and in which a vehicle is allowed to temporarily stop in order to drop the user at the boarding and alighting area 320 from the vehicle or allow the user to board the vehicle from the boarding and alighting area 320. The boarding and alighting area 320 is an area provided so that the user may alight from a vehicle, board a vehicle, or wait at that point until a vehicle arrives. The boarding and alighting area 320 is typically provided on one side of a road on which the stop area 310 has been provided. An eave for avoidance of rain, snow, and sunlight may be provided in the boarding and alighting area 320.

For example, the host vehicle M that the user has boarded stops at the stop area 310 and drops the user at the boarding and alighting area 320. Thereafter, the host vehicle M performs automated driving in an unmanned manner, and starts a self-traveling and parking event in which the host vehicle M autonomously moves from the stop area 310 to the parking space PS in the parking lot PA. A start trigger of the self-traveling and parking event, for example, may be that the host vehicle M has approached to within a predetermined distance from the visit destination facility, may be that the user has activated the remote application 422 in the terminal device 400, or may be that the communication device 20 has wirelessly received a predetermined signal from the parking lot management device 500.

When the self-traveling and parking event is started by the action plan generator 140, the self-traveling and parking controller 142 controls the communication device 20 so that a parking request is transmitted to the parking lot management device 500. When there is a space in the parking lot PA in which the vehicle can be parked, the parking lot management device 500 that has received the parking request transmits a predetermined signal as a response to the parking request to the vehicle, which is a transmission source of the parking request. The host vehicle M that has received the predetermined signal moves from the stop area 310 to the parking lot PA according to guidance of the parking lot management device 500 or while performing sensing by itself. When the self-traveling and parking event is performed, the host vehicle M does not necessarily have to be unmanned, and a staff member of the parking lot PA may board the host vehicle M.

Figure 6:
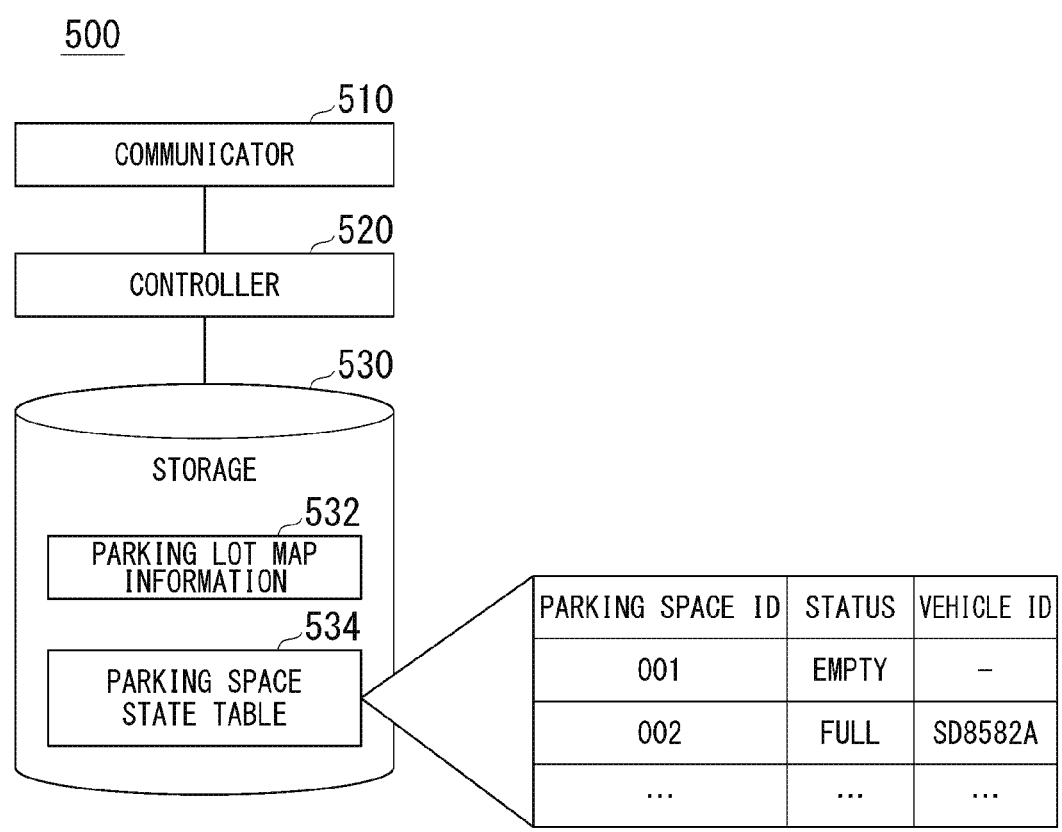
FIG. 6 is a diagram showing an example of a configuration of a parking lot management device.

FIG. 6 is a diagram showing an example of a configuration of the parking lot management device 500. The parking lot management device 500 includes, for example, a communicator 510, a controller 520, and a storage 530. The storage 530 stores information such as parking lot map information 532 and a parking space status table 534.

The communicator 510 wirelessly communicates with the host vehicle M or other vehicles. The controller 520 guides the vehicle to the parking space PS on the basis of the information acquired (received) by communicator 510 and the information stored in storage 530. The parking lot map information 532 is information that geometrically represents a structure of the parking lot PA, and includes, for example, coordinates for each parking space PS. The parking space status table 534 is, for example, a table in which a status indicating whether the parking space is in an empty status in which no vehicle is parked in a parking space indicated by a parking space ID, which is identification information of the parking space PS or a full (parked) status in which a vehicle is parked in the parking space indicated by the parking space ID, and a vehicle ID that is identification information of parked vehicles when the parking space is in the full status are associated with the parking space ID.

When the communicator 510 receives the parking request from the vehicle, the controller 520 extracts the parking space PS that is in an empty status by referring to the parking space status table 534, acquires a position of the extracted parking space PS from the parking lot map information 532, and transmits route information indicating a suitable route to the acquired position of the parking space PS to the vehicle using the communicator 510. The controller 520 may instruct a specific vehicle to stop or instruct the specific vehicle to slow down, as necessary, on the basis of positional relationships between a plurality of vehicles so that the vehicles do not travel to the same position at the same time.

When the host vehicle M receives the route information from the parking lot management device 500, the self-traveling and parking controller 142 generates a target trajectory based on the route. For example, the self-traveling and parking controller 142 may generate a target trajectory in which a speed lower than a speed limit in the parking lot PA has been set as the target speed, and trajectory points have been arranged at a center of the road in the parking lot PA on a route from a current position of the host vehicle M to the parking space PS. When the host vehicle M approaches the parking space PS that is a target, the recognizer 130 recognizes parking frame lines or the like that partition the parking space PS, and recognizes a relative position of the parking space PS with respect to the host vehicle M. When the recognizer 130 has recognized the position of the parking space PS, the recognizer 130 provides a recognition result such as a direction of the recognized parking space PS (a direction of the parking space when viewed from the host vehicle M) or a distance to the parking space PS, to the self-traveling and parking controller 142. The self-traveling and parking controller 142 corrects the target trajectory on the basis of the provided recognition result. The second controller 160 controls the steering and the speed of the host vehicle M according to the target trajectory corrected by the self-traveling and parking controller 142, so that the host vehicle M is parked in the parking space PS.

[Self-Traveling and Parking Event—at the Time of Exit]

The action plan generator 140 and the communication device 20 remain in an operating state even when the host vehicle M is parked. For example, it is assumed that the user who has alighted from the host vehicle M operates the terminal device 400 to activate the remote application 422 and transmits a vehicle pick-up request to the communication device 20 of the host vehicle M. The vehicle pick-up request is a command for calling the host vehicle M from a remote place away from the host vehicle M and requesting the host vehicle M to move to a position close to the occupant.

When the vehicle pick-up request is received by the communication device 20, the action plan generator 140 executes the self-traveling and parking event to activate the self-traveling and parking controller 142. The self-traveling and parking controller 142 generates a target trajectory for moving the host vehicle M from the parking space PS in which the host vehicle M has been parked, to the stop area 310. The second controller 160 moves the host vehicle M to the stop area 310 according to the target trajectory generated by the self-traveling and parking controller 142. For example, the self-traveling and parking controller 142 may generate a target trajectory in which a speed lower than the speed limit in the parking lot PA has been set as the target speed, and trajectory points have been arranged at the center of the road in the parking lot PA on the route to the stop area 310.

When the host vehicle M approaches the stop area 310, the recognizer 130 recognizes the boarding and alighting area 320 facing the stop area 310 and recognizes an object such as a person or luggage present in the boarding and alighting area 320 or recognizes the content displayed on the screen of the terminal device 400 carried by the recognized user. The identifier 182 identifies the user of the host vehicle M or the person relevant to the user from one or more persons present in the boarding and alighting area 320 on the basis of the content recognized by the recognizer 130. When the host vehicle M approaches the user of the host vehicle M or the person relevant to the user identified by the identifier 182, the self-traveling and parking controller 142 further decreases the target speed or moves trajectory points from the center of the road to a position close to the boarding and alighting area 320 to correct the target trajectory. Then, the second controller 160 causes the host vehicle M to stop at a position close to the side of the user of the host vehicle M or the person relevant to the user in the stop area 310. The "side" may indicate, for example, that a distance between the person identified as the user or the person relevant to the user and the host vehicle M is within several meters.

When the self-traveling and parking controller 142 generates the target trajectory in response to the vehicle pick-up request, the action plan generator 140 controls the communication device 20 such that a travel start request is transmitted to the parking lot management device 500. When the controller 450 of the parking lot management device 500 receives the travel start request, the controller 450 of the parking lot management device 500 instructs a specific vehicle to stop or slow down, as necessary, so that the vehicles do not travel to the same position at the same time on the basis of the positional relationship between the plurality of vehicles, as in the time of the entry. When the host vehicle M moves to the stop area 310 and the user in the boarding and alighting area 320 boards the host vehicle M, the self-traveling and parking controller 142 ends the operation. That is, the self-traveling and parking event ends. Thereafter, the automated driving control device 100 plans, for example, a merging event in which the host vehicle M merges from the parking lot PA to a road in a city area and performs automated driving on the basis of the planned event, or the user himself or herself manually drives the host vehicle M.

The present invention is not limited to the above, and the self-traveling and parking controller 142 may find the parking space PS in an empty status by itself on the basis of detection results of the camera 10, the radar device 12, the finder 14, or the object recognition device 16 without depending on communication, and park the host vehicle M in the found parking space.

[Process Flow at the Time of Exit]

Figure 7:
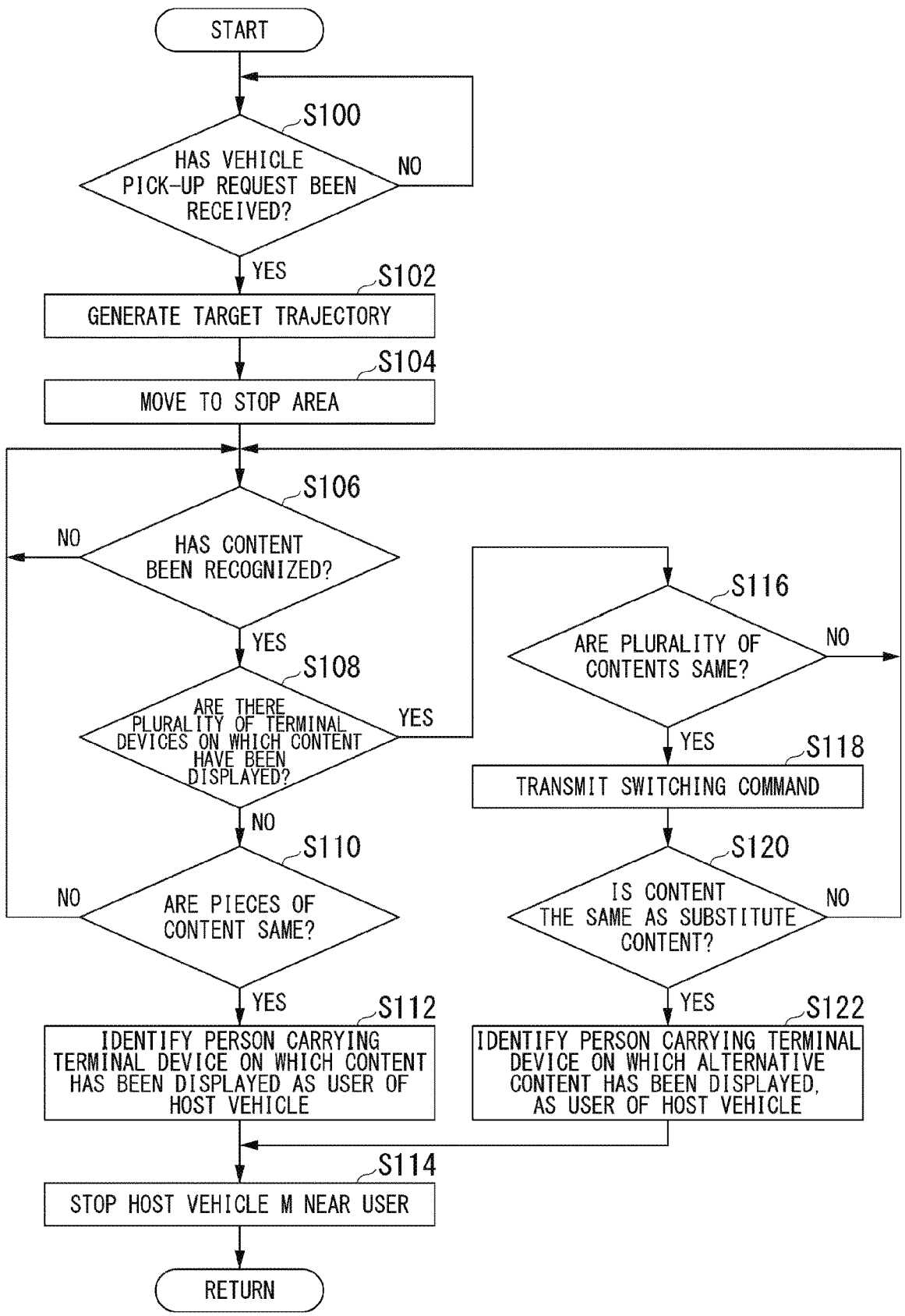
FIG. 7 is a flowchart showing an example of a series of processes of an automated driving control device according to the embodiment.

Hereinafter, a series of processes of the automated driving control device 100 at the time of exit will be described with reference to a flowchart. FIG. 7 is a flowchart showing an example of the series of processes of the automated driving control device 100 according to the first embodiment. A process of the flowchart may be repeatedly performed at predetermined time intervals, for example. It is assumed that the recognizer 130 continues to perform various recognitions unless otherwise specified while the process of the flowchart is being performed.

First, the action plan generator 140 waits until the vehicle pick-up request is received by the communication device 20 (step S100), and executes the self-traveling and parking event when the vehicle pick-up request is received by the communication device 20. Then, the self-traveling and parking controller 142 generates a target trajectory for moving the host vehicle M from the parking space PS in which the host vehicle M has been parked, to the stop area 310 (step S102).

Then, the second controller 160 performs automated driving on the basis of the target trajectory generated by the self-traveling and parking controller 142 when the vehicle pick-up request has been received, so that the host vehicle M moves to the stop area 310 (step S104).

Then, when the host vehicle M approaches the stop area 310, the identifier 182 waits until the recognizer 130 recognizes that content is displayed on the screen of the terminal device 400 carried by a person present in the stop area 310 (step S106). When the recognizer 130 recognizes that the content is displayed on the screen of the terminal device 400, the identifier 182 determines whether or not there are a plurality of terminal devices 400 that have displayed the content (step S108). That is, the identifier 182 determines whether the recognizer 130 has recognized that the content is displayed on respective screens of the plurality of terminal devices 400.

When the identifier 182 has determined that only one terminal device 400 has displayed the content, the identifier 182 determines whether or not the content displayed on the one terminal device 400 is the same as the content included in the content data 192 (step S110).

For example, when a plurality of pieces of content are included in the content data 192, the identifier 182 calculates a degree of similarity between the content displayed on the terminal device 400 and each of the plurality of pieces of content. The identifier 182 determines that the content displayed on the terminal device 400 is the same as the content included in the content data 192 when the degree of similarity between the content displayed on the terminal device 400 and any one of the plurality of pieces of content is equal to or greater than the threshold value, and determines that the content displayed on the terminal device 400 is not the same as the content included in the content data 192 when the degree of similarity between the content displayed on the terminal device 400 and all of the plurality of pieces of content is smaller than the threshold value.

When the identifier 182 has determined that the content displayed on the terminal device 400 is not the same as the content included in the content data 192, the process returns to S106. Thereby, the recognizer 1300 continues a content recognition process.

On the other hand, when the identifier 182 has determined that the content displayed on the terminal device 400 is the same as the content included in the content data 192, the identifier 182 identifies the person carrying the terminal device 400 on which the content has been displayed as the user of the host vehicle M or the person relevant to the user (step S112).

Next, the self-traveling and parking controller 142 corrects the target trajectory by further decreasing the target speed or moving the trajectory points from the center of the road to the vicinity of the boarding and alighting area 320. Then, the second controller 160 causes the host vehicle M to stop while causing the host vehicle M to slow down on the side of a person (for example, within several meters) identified as the user of the host vehicle M or the person relevant to the user in the stop area 310 (step S114).

On the other hand, when the identifier 182 has determined that the number of the terminal devices 400 on which the content has been displayed in the process of S108 is not 1 but is plural, the identifier 182 determines whether or not two or more of the pieces of content displayed on the plurality of respective terminal devices 400 are the same as the content included in the content data 192 (step S116). That is, the identifier 182 determines whether or not there are a plurality of persons carrying the terminal device 400 on which specific content (the same content as the content associated with the host vehicle M) has been displayed, among a plurality of persons carrying the terminal device 400 on which the content has been displayed.

When the identifier 182 has determined that none of the pieces of content displayed on the plurality of terminal devices 400 is the same as the content included in the content data 192, the process returns to S106. Thereby, the recognizer 1300 continues the content recognition process.

On the other hand, when the identifier 182 has determined whether or not two or more of the pieces of content displayed on the plurality of respective terminal devices 400 are the same as the content included in the content data 192, the communication controller 184 controls the communication device 20 so that a command (hereinafter referred to as a switching command) for switching content to be displayed on the screen to alternative content is transmitted to the terminal device 400 carried by the user of the host vehicle M or the person relevant to the user (step S118).

For example, when the user of the host vehicle M or the person relevant to the user is present among persons waiting in the boarding and alighting area 320, the alternative content will be displayed on the screen of the terminal device 400 carried by any of the persons. Therefore, after the communication controller 184 has transmitted the switching command to the terminal device 400 carried by the user of the host vehicle M or the person relevant to the user, the identifier 182 determines whether or not any one of the plurality of pieces of content recognized by the recognizer 130 is the same as the alternative content (step S120).

The communication controller 184 may transmit the alternative content instead of transmitting the switching command to the terminal device 400 carried by the user of the host vehicle M or the person relevant to the user. For example, the communication controller 184 may transmit the alternative content to the terminal device 400 via a website provided by the web server included in the network NW, or may transmit the alternative content to the terminal device 400 via an application provided by the application server included in the network NW. The communication controller 184 may directly transmit the alternative content to the terminal device 400 using a wireless communication network such as Wi-Fi.

When the identifier 182 has determined that none of the plurality of pieces of content recognized by the recognizer 130 is the same as the alternative content, the identifier 182 determines that there is no user of the host vehicle M or person relevant to the user in the boarding and alighting area 320, and the process returns to S106. Thereby, the recognizer 1300 continues the content recognition process until the user of the host vehicle M or the person relevant to the user appears in the boarding and alighting area 320.

On the other hand, when the identifier 182 has determined whether or not any one of the plurality of pieces of content recognized by the recognizer 130 is the same as the alternative content, the identifier 182 identifies the person carrying the terminal device 400 on which the same content as the alternative content has been displayed, as the user of the host vehicle M or the person relevant to the user (step S122). The identifier 182 proceeds to the process of S114.

Figure 8:
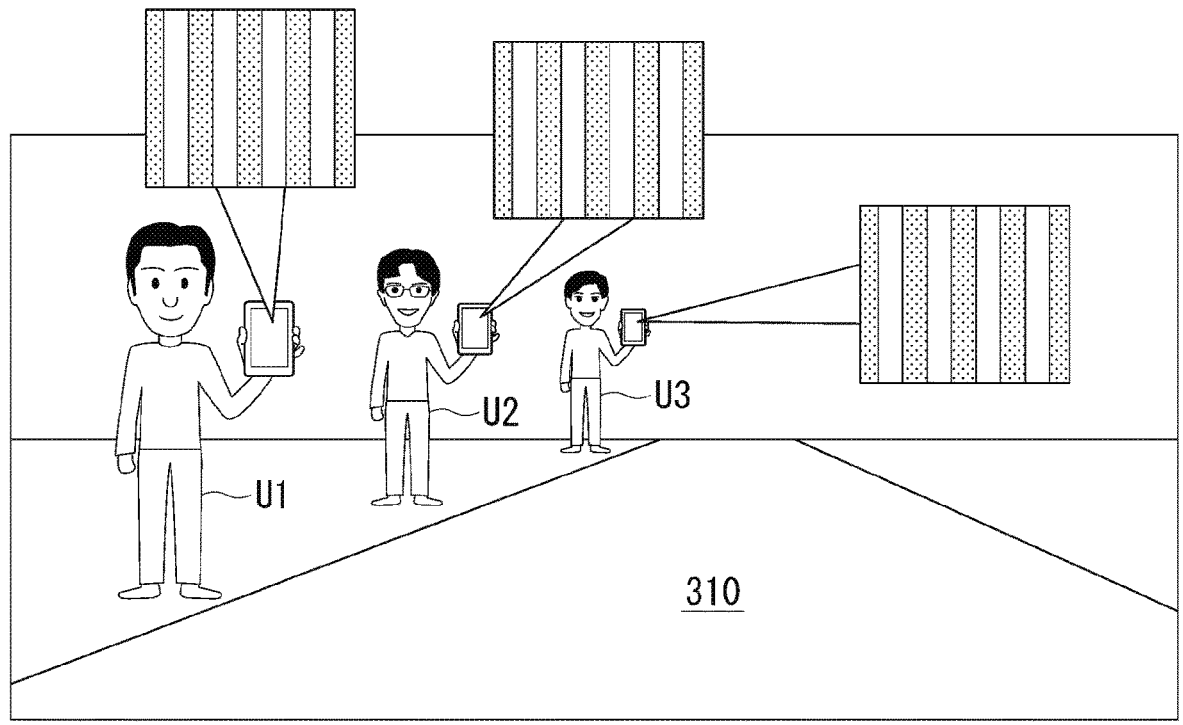
FIG. 8 is a diagram showing an example of a scene in which a plurality of persons wait in a boarding and alighting area.

FIG. 8 is a diagram showing an example of a scene in which a plurality of persons wait in the boarding and alighting area 320. In the shown example, each of a first person U1, a second person U2, and a third person U3 waits in the boarding and alighting area 320 in a state in which the content has been displayed on the terminal device 400. In such a scene, the recognizer 130 recognizes that the content is displayed on each of the three terminal devices 400. Therefore, the identifier 182 determines whether or not the content is the same as the content included in the content data 192 for each of the three terminal devices 400.

For example, when the content included in the content data 192 is an image in which a vertical stripe pattern has been drawn, the image in which the vertical stripe pattern has been drawn is displayed on each of the three terminal devices 400. Therefore, the identifier 182 determines that a total of three pieces of content displayed on the three terminal devices 400 are the same as the content included in the content data 192. That is, the identifier 182 determines that there are three persons carrying the terminal device 400 on which the specific content in which a vertical stripe pattern has been drawn has been displayed, among the three persons waiting in the boarding and alighting area 320. In this case, any of the three persons is likely to be the user of the host vehicle M or the person relevant to the user.

Therefore, the communication controller 184 controls the communication device 20 so that the switching command is transmitted to the terminal device 400 carried by the user of the host vehicle M or the person relevant to the user. For example, when the alternative content is a vertical stripe image, the communication controller 184 transmits a switching command for instructing to switch the image from a vertical stripe image to a horizontal stripe image to the terminal device 400.

Figure 9:
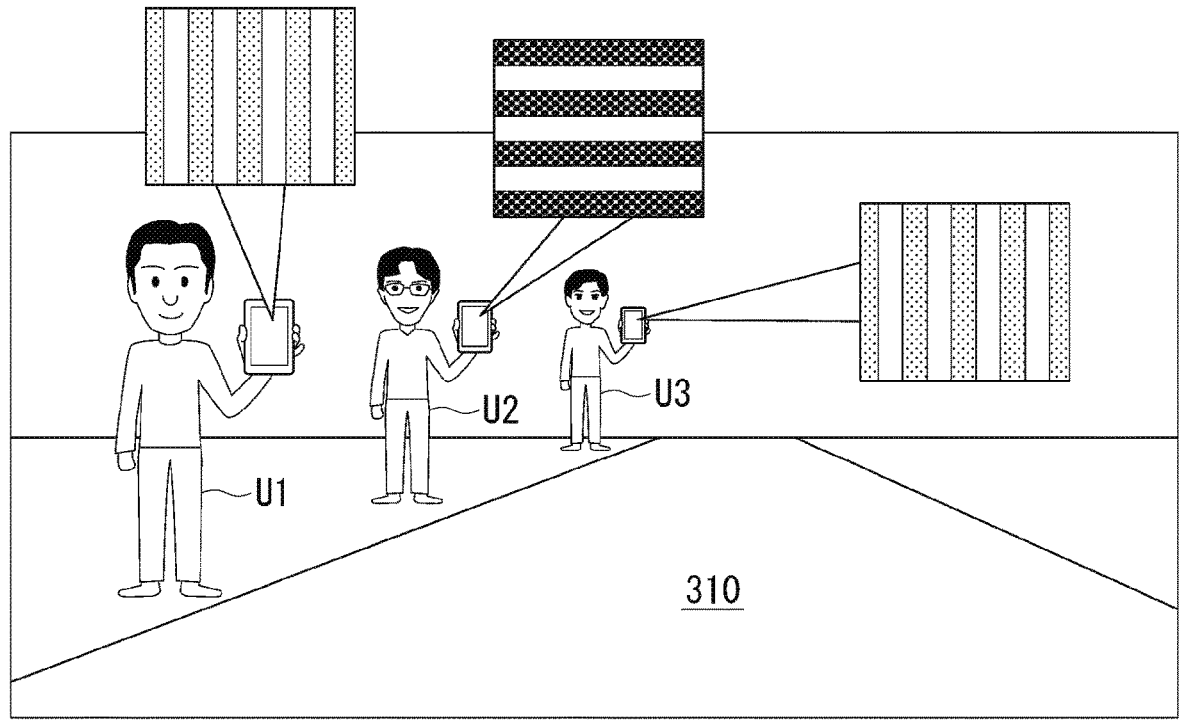
FIG. 9 is a diagram showing another example of the scene in which the plurality of persons wait in the boarding and alighting area.

FIG. 9 is a diagram showing another example of the scene in which the plurality of persons wait in the boarding and alighting area 320. In the shown example, a scene after the switching command has been transmitted to the terminal device 400 carried by the user of the host vehicle M or the person relevant to the user is shown. The content displayed on the terminal device 400 carried by the second person U2 among the terminal devices 400 carried by the first person U1, the second person U2, and the third person U3 is switched from the vertical stripe image to the horizontal stripe image.

As described above, when the switching command is a command for instructing to change the image to the horizontal stripe image as the alternative content, the horizontal stripe image is displayed on the terminal device 400 carried by the second person U2 in the shown scene. Therefore, the identifier 182 determines that the content displayed on the terminal device 400 carried by the second person U2 among the plurality of pieces of content recognized by the recognizer 130 is the same as the alternative content, and identifies the person carrying the terminal device 400 on which the same content as the alternative content has been displayed, that is, the second person U2, as the user of the host vehicle M or the person relevant to the user.

Figure 10:
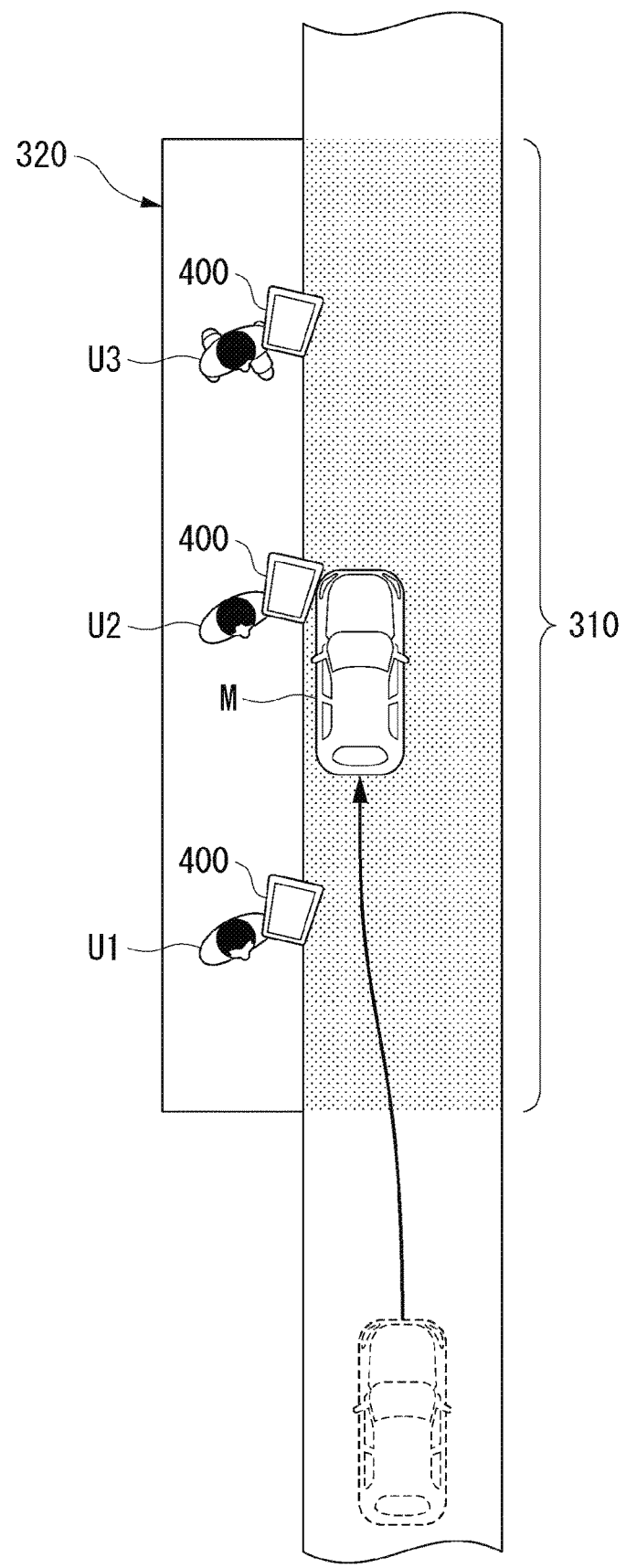
FIG. 10 is a diagram schematically showing a state of automated driving that is performed after a user of the host vehicle or a person relevant to the user has been identified.

FIG. 10 is a diagram schematically showing a state of automated driving that is performed after the user of the host vehicle M or the person relevant to the user is identified. As described above, for example, when a second person U2 is identified as the user of the host vehicle M or the person relevant to the user from a total of three persons including a first person U1, the second person U2, and a third person U3, the self-traveling and parking controller 142 generates a target trajectory for causing the host vehicle M to approach the second person U2 while traveling slowly. Thereby, the host vehicle M stops on the side of the second person U2.

[Process Flow of Terminal Device]

Figure 11:
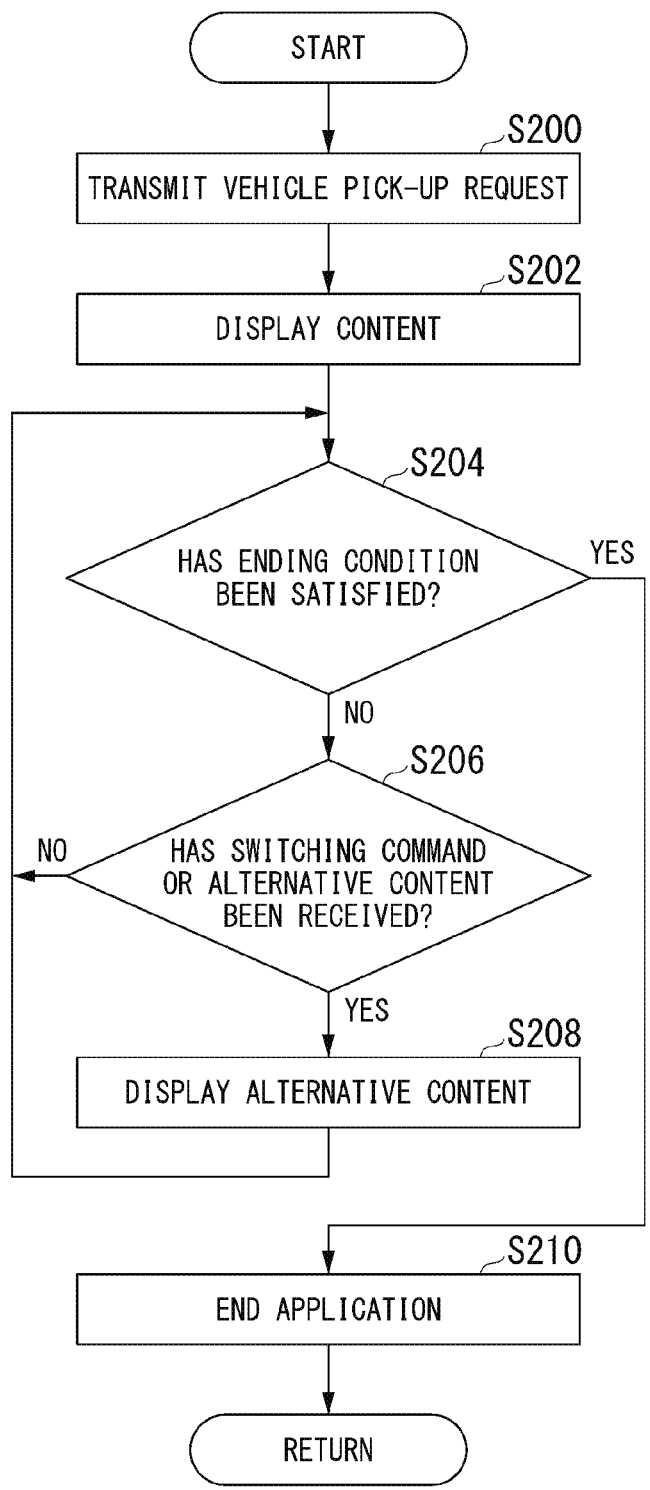
FIG. 11 is a flowchart showing an example of a series of processes of the terminal device according to the first embodiment.

Hereinafter, a series of processes of the terminal device 400 will be described with reference to a flowchart. FIG. 11 is a flowchart showing an example of a series of processes of the terminal device 400 according to the first embodiment. The process of the flowchart may be repeatedly performed at a predetermined cycle when the remote application 422 is activated, for example.

First, the controller 410 transmits the vehicle pick-up request to the vehicle system 2 of the host vehicle M via the communicator 402 (step S200).

Then, the controller 410 causes the display 404 to display the specific content (step S202). For example, when the controller 410 displays the specific content on the display 404, the controller 410 relatively increases luminance of the display 404 to brighten a screen of the display 404, as compared with a case in which when the controller 410 does not display the specific content. Thereby, it is easy for the content displayed on the display 404 to be recognized by the host vehicle M.

Then, the controller 410 determines whether or not an ending condition of the remote application 422 has been satisfied (step S204). Examples of the ending condition of the remote application 422 include that the user uses the host vehicle M called from a remote place, that the host vehicle M called from the remote place stops in the stop area 310, and that the user performs an operation for ending the application with respect to the inputter 406.

When the controller 410 has determined that the ending condition of the remote application 422 has not been satisfied, the controller 410 determines whether the communicator 402 has received the switching command or the alternative content from the vehicle system 2 of the host vehicle M (step S206).

When the communicator 402 has not received the switching command or the alternative content from the vehicle system 2 of the host vehicle M, the controller 410 waits until the ending condition of the remote application 422 is satisfied.

On the other hand, when communicator 402 has received the switching command or the alternative content from the vehicle system 2 of host vehicle M, the controller 410 causes the display 404 to display the alternative content (step S208).

For example, when the switching command has been received by the communicator 402, the controller 410 selects the content designated by the switching command from among the plurality of pieces of content stored in the storage 420, and displays the selected content as the alternative content on the display 404. For example, when the alternative content has been received by the communicator 402, the controller 410 displays the alternative content on the display 404. In this case, the controller 410 may relatively increase luminance of the display 404 to brighten the screen of the display 404, as compared with a case in which the controller 410 does not display the alternative content.

On the other hand, when the controller 410 has determined in the process of S206 that the ending condition of the remote application 422 has been satisfied, the controller 410 ends the remote application 422 (step S210), and ends the process of the flowchart.

According to the first embodiment described above, since the vehicle control system includes the recognizer 130 that recognizes the content (an example of the first content) displayed on the terminal device 400, and the identifier 182 that identifies a person carrying the terminal device 400 with the content displayed thereon outside the host vehicle M as the user of the host vehicle M or the person relevant to the user on the basis of a comparison between the content recognized by the recognizer 130 and one or more pieces of content included in the content data 192, it is possible to accurately identify the user who is remotely operating the vehicle from outside the vehicle.

According to the first embodiment described above, for example, when the user of the host vehicle M or the person relevant to the user is identified from the plurality of persons waiting in the boarding and alighting area 320 by the identifier 182, the self-traveling and parking controller 142 generates a target trajectory for causing the host vehicle M to approach the user of the host vehicle M or the person relevant to the user. Thereby, since the second controller 160 stops the host vehicle M on the side of the user identified as the user of the host vehicle M or the person relevant to the user in the stop area 310, it is possible to improve convenience when the user uses the vehicle.

Second Embodiment

Hereinafter, a second embodiment will be described. In the first embodiment, a case in which the terminal device 400 is caused to display specific content for causing the host vehicle M to identify the user has been described. On the other hand, the second embodiment is different from the first embodiment described above in that auxiliary content (hereinafter referred to as sub-content) for designating an automated driving aspect of the host vehicle M, that is, an event is included in the specific content to be displayed on the terminal device 400. Hereinafter, differences between the second embodiment and the first embodiment will be mainly described, and a description of respects common to the second embodiment and the first embodiment will be omitted. In the description of the second embodiment, portions that are same as in the first embodiment are denoted with the same reference signs.

Figure 12:
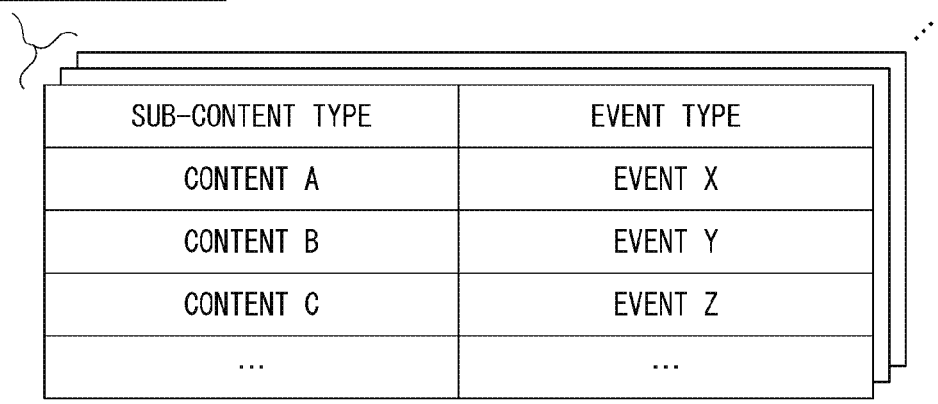
FIG. 12 is a diagram showing an example of content data according to a second embodiment.

FIG. 12 is a diagram showing an example of a content data 192 according to the second embodiment. In the content data 192 according to the second embodiment, an event in which a traveling aspect (the automated driving aspect) of the host vehicle M under automated driving has been defined is associated with each sub-content that can be included in the specific content.

The controller 410 of the terminal device 400 according to the second embodiment causes the display 404 to display the content corresponding to the host vehicle M as the specific content and to display sub-content.

Figure 13:
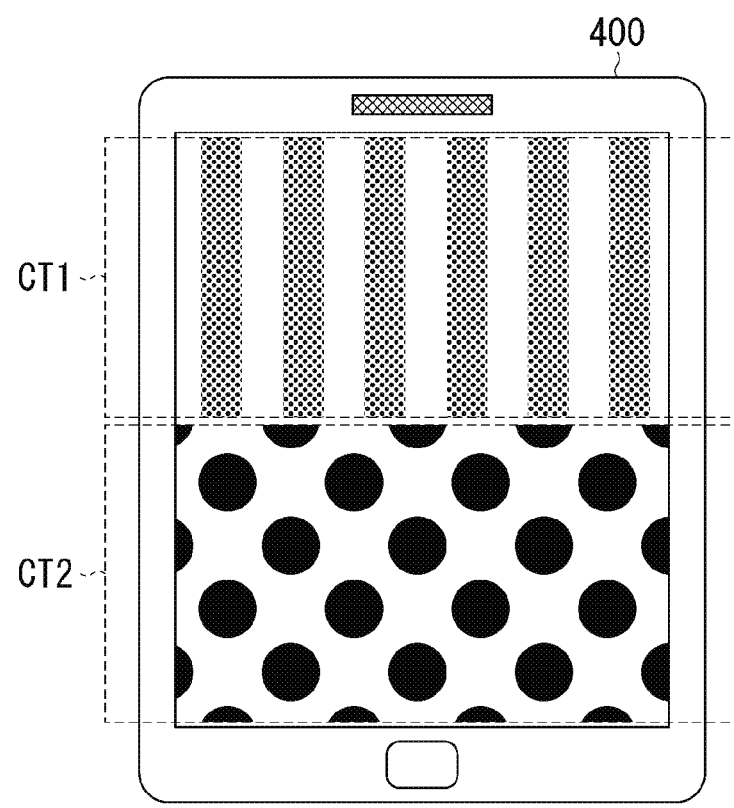
FIG. 13 is a diagram showing an example of a screen of a terminal device.

FIG. 13 is a diagram showing an example of the screen of the terminal device 400. In FIG. 13, CT1 indicates the specific content for causing the host vehicle M to identify a user, and CT2 indicates the sub-content. For example, it is assumed that the sub-content CT2 is associated with an event in which the host vehicle M is caused to stop at a position 5 [m] away from a person identified as the user of the host vehicle M or the person relevant to the user. In such a case, when the sub-content CT2 (an example of first sub-content) is recognized by the recognizer 130, the action plan generator 140 determines whether or not the sub-content CT2 recognized by the recognizer 130 is the same as any one of one or more pieces of sub-content (an example of second sub-content) included in the content data 192. When the same sub-content as the sub-content CT2 is included in the content data 192, the action plan generator 140 generates a target trajectory on the basis of the event associated with the sub-content CT2 in the content data 192. Thereby, when the host vehicle M identifies the user of the host vehicle M or the person relevant to the user, the host vehicle M stops at a position 5 [m] away from the user. Thus, by simultaneously displaying the two types of content on the screen of the terminal device 400, it is possible to cause the vehicle system 2 of the host vehicle M to identify the user of the host vehicle M or the person relevant to the user, and to remotely instruct automated driving to be performed.

In the second embodiment described above, a case in which the sub-content is associated with the event in which a traveling aspect of the host vehicle M under automated driving has been defined has been described above, but the present invention is not limited thereto. For example, the sub-content may be associated with an event in which operations of in-vehicle devices not relevant to the speed or steering, such as startup of an engine of the host vehicle M, opening and closing of doors, opening and closing of a trunk lid, an operation of a wiper, and turning-on of a headlight have been defined. For example, when the sub-content recognized by the recognizer 130 is associated with an event in which the engine of the host vehicle M is started up, the second controller 160 controls an ignition device (not shown) or the like so that the engine of the host vehicle M is started up. In this case, the action plan generator 140 and the second controller 160 are examples of a "third controller".

According to the second embodiment described above, because the content for identifying the user of the host vehicle M or the person relevant to the user and the content for designating automated driving to be performed or an in-vehicle device to be controlled are displayed on the terminal device 400, it is possible to cause the vehicle system 2 of the host vehicle M to identify the user, and it is possible for the user to remotely control the host vehicle M.

[Hardware Configuration]

Figure 14:
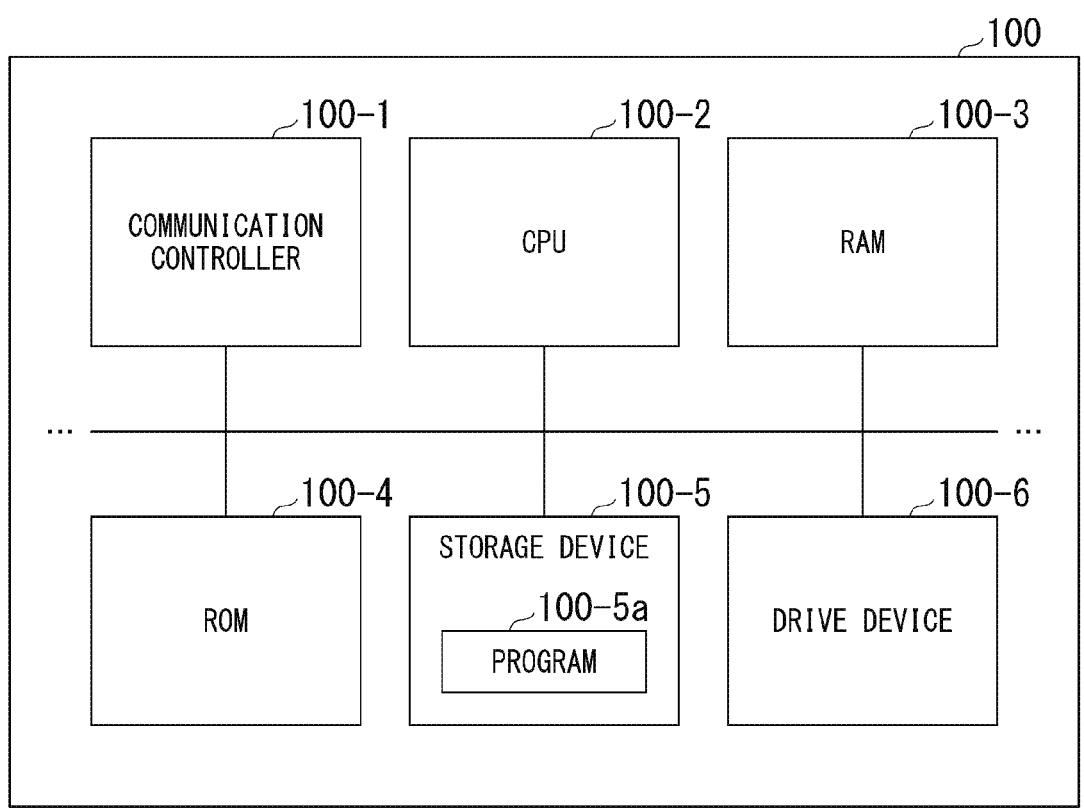
FIG. 14 is a diagram showing an example of a hardware configuration of the automated driving control device according to the embodiment.

FIG. 14 is a diagram showing an example of a hardware configuration of the automated driving control device 100 according to the embodiment. As shown in FIG. 14, the automated driving control device 100 has a configuration in which a communication controller 100-1, a CPU 100-2, a RAM 100-3 that is used as a working memory, a ROM 100-4 that stores a boot program or the like, a storage device 100-5 such as a flash memory or an HDD, a drive device 100-6, and the like are connected to each other by an internal bus or a dedicated communication line. The communication controller 100-1 communicates with components other than the automated driving control device 100. A program 100-5a to be executed by the CPU 100-2 is stored in the storage device 100-5. This program is developed in the RAM 100-3 by a direct memory access (DMA) controller (not shown) or the like and executed by the CPU 100-2. Thereby, one or both of the first controller 120, the second controller 160, and the third controller 180 are realized.

The embodiment described above can be represented as follows.

A vehicle control device including a storage that stores a program; and a processor, and configured to recognize first content displayed on a terminal device, and identify a person carrying the terminal device with the first content displayed thereon outside the vehicle as a user scheduled to use the vehicle or a person relevant to the user on the basis of a comparison between the recognized first content and one or more pieces of content associated with the vehicle, by the processor executing the program.

While forms for carrying out the present invention have been described using the embodiments, the present invention is not limited to these embodiments at all, and various modifications and substitutions can be made without departing from the gist of the present invention.

What is claimed is:

1. A vehicle control system comprising:
a processor configured to execute instructions to:
recognize a person outside a vehicle using sensors including a camera,
recognize first content displayed on a screen of a terminal device by analyzing an image captured by the camera, which is the image of the screen of the terminal device carried by the person;
compare the recognized first content and predetermined content associated with the vehicle, and
identify the person as a user scheduled to use the vehicle or a person relevant to the user based on a comparison between the recognized first content and the predetermined content,
wherein the processor configured to further execute instructions to:
when it is recognized that there are a plurality of persons outside the vehicle, and when it is the recognized that the first content is displayed on the screen of the terminal device carried by each of the plurality of persons, transmit second content different from the first content the terminal device carried by the user or the person relevant to the user, and
when it is the recognized that second content is displayed on the screen of the terminal device carried by a person among the terminal device each of the plurality of persons, identify the person carrying the terminal device with the second content displayed thereon as the user or the person relevant to the user.

2. The vehicle control system according to claim 1, wherein the predetermined content is content for identifying the person as the user or the person relevant to the user and having features for comparison with features that the first content has, and
wherein the processor configured to further execute instructions to: identify the person as the user or the person relevant to the user when the features of the first content is the same as the features of the predetermined content.

3. The vehicle control system according to claim 1, wherein the processor configured to further execute instructions to:
control steering and a speed of the vehicle so that the vehicle is stopped on the side of the user or the person relevant to the user when it is identified that that the person is the user or the person relevant to the user.

4. The vehicle control system according to claim 1,
wherein a first image with an arrangement of one or more colors is included in the first content,
a second image with an arrangement of one or more colors is included in the predetermined content, and
wherein the processor configured to further execute instructions to: identify the person as the user or the person relevant to the user when the color arrangement of the first image is the same as the color arrangement of the second image.

5. The vehicle control system according to claim 1,
wherein a first image in which a first pattern has been drawn is included in the first content,
a second image in which a second pattern has been drawn is included in the predetermined content, and
wherein the processor configured to further execute instructions to: identify the person as the user or the person relevant to the user when the first pattern is the same as the second pattern.

6. The vehicle control system according to claim 1, wherein the processor configured to further execute instructions to: brighten the screen of the terminal device, as compared with a case in which a content is not display on the screen of the terminal device when the content display on the screen of the terminal device.

7. The vehicle control system according to claim 1,
wherein first sub-content associated with a control aspect of the vehicle is included in the first content,
second sub-content associated with the control aspect of the vehicle is included in the predetermined content, and
wherein the processor configured to further execute instructions to: control the vehicle based on the control aspect associated with the first sub-content or the second sub-content when the first sub-content is the same as the second sub-content.

8. A vehicle control method comprising:
recognizing a person outside a vehicle using sensors including a camera,
recognizing first content displayed on a screen of a terminal device by analyzing an image captured by the camera, which is the image of the screen of the terminal device carried by the person;
comparing the recognized first content and predetermined content associated with the vehicle,
identifying the person as a user scheduled to use the vehicle or a person relevant to the user based on a comparison between the recognized first content and the predetermined content,
when it is recognized that there are a plurality of persons outside the vehicle, and when it is the recognized that the first content is displayed on the screen of the terminal device carried by each of the plurality of persons, transmitting second content different from the first content the terminal device carried by the user or the person relevant to the user, and
when it is the recognized that second content is displayed on the screen of the terminal device carried by a person among the terminal device each of the plurality of persons, identifying the person carrying the terminal device with the second content displayed thereon as the user or the person relevant to the user.

* * * * *